United States Patent [19]

Waddill

[11] Patent Number: 4,800,222
[45] Date of Patent: Jan. 24, 1989

[54] ACCELERATOR FOR CURING EPOXY RESINS COMPRISING PIPERAZINE, TRIETHANOLAMINE AND TRIS(DIMETHYLAMINOMETHYL)-PHENOL

[75] Inventor: Harold G. Waddill, Austin, Tex.
[73] Assignee: Texaco Inc., White Plains, N.Y.
[21] Appl. No.: 88,329
[22] Filed: Aug. 24, 1987
[51] Int. Cl.$^4$ .................... C08G 59/62; C08G 59/64; C08G 59/68
[52] U.S. Cl. .................. 528/94; 252/182.34
[58] Field of Search .................. 528/94; 252/182, 34

[56] References Cited

U.S. PATENT DOCUMENTS 3,943,104  3/1976  Wadill ........................ 528/94
4,284,574  8/1981  Bagga ......................... 549/555
4,661,529  4/1987  Kuhn et al. ................. 521/902

Primary Examiner—John Kight
Assistant Examiner—Frederick Krass
Attorney, Agent, or Firm—Jack H. Park; Kenneth R. Priem; Richard A. Morgan

[57] ABSTRACT

A composition for accelerating the amine cure of epoxy resins is disclosed. The accelerating composition comprises: piperazine, tris(dimethylaminomethyl)phenol and triethanolamine.

The accelerator combination is synergistic for accelerating the curing of epoxy resins in thin films or in mass. The products cured with the inventive accelerator combination demonstrated improved properties over products cured with the accelerator components individually.

1 Claim, No Drawings

ACCELERATOR FOR CURING EPOXY RESINS COMPRISING PIPERAZINE, TRIETHANOLAMINE AND TRIS(DIMETHYLAMINOMETHYL)PHENOL

BACKGROUND OF THE INVENTION

1. Field of the Invention

The invention is a composition for accelerating the curing of epoxy resins with amines.

2. Description of the Art

Epoxy resins constitute a broad class of polymeric materials having a wide range of physical characteristics. The resins are characterized by epoxide groups which are cured by reaction with catalysts or curing agents to provide cured epoxy resin compositions with certain desirable properties.

U.S. Pat. No. 4,518,749 to H. G. Waddill teaches an epoxy resin composition comprising a polyepoxide and a curing amount of a bis(hydrogen maleate) derivative of a polyoxypropylene diamine. Example 3 teaches that tris(dimethylaminomethyl)phenol is an accelerator for the curing of an epoxy resin. *Handbook of Epoxy Resins,* H. Lee and K. Neville, p. 7-2 states that in curing epoxy resins with amines, that tris(dimethylaminomethyl)phenol is superior to phenol.

U.S. Pat. No. 3,875,072 to H. G. Waddill teaches a composition which is synergistic for accelerating the curing of a polyglycidyl ether of a polyhydric phenol cured with a polyoxyalkylenepolyamine. The composition comprises piperazine and an alkanolamine in a weight ratio of 1:8 to 1:1.

U.S. Pat. No. 4,195,153 to H. G. Waddill teaches an epoxy resin curing accelerator comprising a mixture of N-aminoethylpiperazine (AEP) and triethanolamine (TEA).

U.S. Pat. No. 4,189,564 to H. G. Waddill teaches an epoxy resin curing accelerator comprising a mixture of piperazine, N-aminoethylpiperazine (AEP) and triethanolamine (TEA). The mixture is synergistic for curing an epoxy resin with an amine at ambient or elevated temperature.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

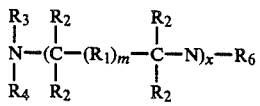

wherein R's are selectively defined as hydrogen, alkyl radicals and alkylene oxide radicals and x and m are defined integers.

U.S. Pat. No. 3,864,358 to D. Porret and J. Habermeier describes epoxy-acrylic acid esters obtained when 3-(acryloyloxyalkyl)-hydantoins are glycidylated. Both 2,4,6-tris(dimethylaminoethyl)phenol and N-(2-aminoethyl)piperazine are mentioned as epoxy resin curing agents. The compound 2,4,6-tris(dimethylaminoethyl)phenol is taught as an accelerator for the curing of epoxy resins. In contrast, these compounds are used in combination, in small amounts as an accelerator in the instant invention.

U.S. Pat. No. 4,284,574 to M. M. Bagga teaches diglycidyl ethers of di-secondary alcohols as epoxy resins. Both 2,4,6-tris(dimethylaminoethyl)phenol and N-(2-aminoethyl)piperazine are mentioned as curing agents for epoxy resins. Accelerators include 2,4,6-tris(dimethylaminomethyl)phenol.

SUMMARY OF THE INVENTION

The invention is a composition for accelerating the curing of a polyglycidyl ether of a polyhydric phenol cured with an amine. The composition comprises piperazine, tris(dimethylaminomethyl)phenol and an alkanolamine.

DETAILED DESCRIPTION OF THE INVENTION

The invention is an improvement in U.S. Pat. No. 3,875,072 incorporated herein by reference, which is drawn to an accelerator composition comprising piperazine and an alkanolamine in a weight ratio of about 1:8 to 1:1; preferably 1:4 to 1:2. The invention is also an improvement in the use of tris(dimethylaminomethyl)phenol alone as an accelerator, described in U.S. Pat. No. 4,518,749.

According to one embodiment of the instant inventive concept, blends of a polyepoxide, an amine curing agent and a combination of piperazine, tris(dimethylaminomethyl)phenol and an alkanolamine are thoroughly admixed and cured in accordance with conventional methods to provide cured epoxy resins having excellent properties.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[p-2,3 epoxy propoxy) phenyl]propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2- epoxy groups per molecule. An illustrative, but by no means exhaustive, listing of suitable dihydric phenols includes 4,4'-isopropylidene bisphenol,
2,4'-dihydroxydiphenylethyl methane,
3,3'-dihydroxydiphenyldiethylmethane,
3,4'-dihy-droxydiphenylmethylpropylmethane, 2,3′-dihydroxydiphenylethylphenylmethane,
4,4′-dihydroxydiphenylpropylphenylmethane,
4,4′-dihydroxydiphenylbutylphenylmethane,
2,2′-dihydroxydiphenylditolylmethane,
4,4′-dihydroxydiphenyltolylmethylmethane and the like.

Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4- hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2′-, 3,3′-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like, oxyalkylene polyamines such as polyoxypropylene, di-and triamine and 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

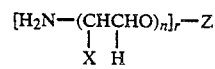

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 3,654,370. The most preferred polyoxyalkylene polyamine is a polyoxypropylene diamine having a molecular weight of about 230.

Another preferred class of polyoxyalkylene polyamines can be depicted by the formula:

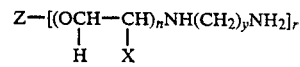

wherein X,Z, n and r are defined above and y is 2 or 3. These poly(aminoalkylamino)polyethers are the hydrogenated product of the cyanoalkylated adduct of a polyoxyalkylene polyamine as described. The preparation of the cyanoalkylated adducts is described in U.S. Pat. No. 3,666,788 to Rowton.

Examples of preferred alkanolamines useful in the invention include mono-, di-and triethanolamine, hydroxy ethoxyethylamine, N-aminoethylethanolamine, N,N-bis(hydroxypropyl), N-hydroxyethylamine, and the like. Triethanolamine is especially preferred.

It has been found that combinations of piperazine, tris(dimethylaminomethyl)phenol and an alkanolamine effectively accelerate amine curing of epoxy resins in thin films as well as in mass. When used alone, tris(dimethylaminomethyl)phenol is noted for embrittlement of coating and ineffective acceleration in mass (thick) applications.

Applicant has discovered critically in the formulation. When more than 30 parts by weight tris(dimethylaminomethyl)phenol was incorporated the coatings were brittle. When less than 20 parts by weight tris(-dimethylaminomethyl)phenol was incorporated there was little or no improvement in drying time. When more than 60 parts by weight triethanolamine was incorporated the curing time of thin films was slowed. Less than 50 parts by weight triethanolamine was insufficient to solubilize the piperazine component. In the formulation, piperazine is the active accelerating component. Therefore the most effective amount of piperazine is the saturation amount. About 20% piperazine was dissolved and provided sufficient activity to accelerate curing in bulk and in thin films.

The particular order of mixing of the above described components is not critical in the practice of the instant invention. For example, the amine curing agent tris(- dimethylaminomethyl)phenol, piperazine and alkanolamine components may be blended in any desired order or manner to provide a homogenous mixture of accelerated curing agents. The mixture may then be incorporated into or mixed with the above described resin component at time of use to give an accelerated self-curing resin at ambient temperature.

In a preferred method of practicing the invention, the tris(dimethylaminomethyl)phenol, piperazine and alkanolamine components are first blended. The blend is then added to the amine curing agent component and this overall mixture is finally admixed with the above-described resin component at time of use. The accelerator blend is capable of being stored for long periods of time, even at low temperatures.

I have found that the utilization of the components of the accelerator combination within the described combined weight ratio is highly synergistic for accelerating the self-curing of the above-described epoxy resin types cured with amine curing agents at ambient temperature. Accordingly, experiments have shown that where piperazine or an alkanolamine is utilized alone, or where the weight ratio of the components is outside the prescribed range, the rate of curing at ambient temperature is drastically reduced.

The combined weight of, tris(dimethylaminomethyl)-phenol piperazine and alkanolamine components present when mixed with the polyoxyalkylenepolyamine may range from about 1 to 100 parts by weight per 100 parts by weight of the polyoxyalkylenepolyamine. The optimum amount may vary somewhat for a given application depending upon the particular epoxy resin, polyoxyalkylenepolyamine and alkanolamine being utilized, and is best determined empirically for the most effective amount.

In the curing of epoxy resins, the curing-hardening agent is usually added in an amount that will provide one reactive-NH in the combined hardener-curing components for each epoxy group in the epoxy resin component. These are known in the are as stoichiometric quantities. Usually the stoichiometric quantities can be calculated from a knowledge of the chemical structure and analytical data on the particular components being utilized. However, many time the stoichiometric quantity is found empirically. A particular example of such a method is measuring the maximum exotherm temperature during the curing of the epoxy resin at different hardening-curing agent concentration. A graph of the exotherm temperature vs. the concentration of hardening-curing agent will exhibit a maximum at or near the stoichiometic quantity.

For the purposes of the instant invention, the stoichiometic amount of the hardening-curing agnet is calculated by adding together the number of equivalents on the basis of weight per replaceable-NH group in the amine curing agent N-aminoethylpiperazine and alkanolamine components utilized. Preferably, these components are utilized in amounts that will provide up to 10 percent excess of the stoichiometric amount.

Should fire retardance be required for the epoxy resins cured by the process and composition of the present invention, it will be understood that various fire retardants for epoxy resins in compositions known in the are can be utilized without departing from the intended scope of the invention. Experiments have shown that well known epoxy resin fire retardants, for example, various halogenated compounds, phosphate compounds, even including piperazine phosphate, and the like, can be utilized in effective amounts in the above-described invetive process without affecting the synergistic effect of the accelerator combination of N-aminoethylpiperazine and alkanolamine components upon the accelerated curing rate. Preferably, where fire retardance is desirable, an effective amount of piperazine phosphate is incorporated into the above-described mixture. Accordingly, the piperazine phosphate may be added at any time during the mixing of the components without affecting the described synergistic effect.

The above-described mixture of epoxy resin, amine curing agent, and accelerator combination also preferably allowed to self-cure at ambient temperatures of bwtween about 0° to about 45° C. However, the mixture can be cured or post-cured at elevated temperatures up to about 125° C., if desirable and convenient.

The following Example illustrates the practice of the invention in more detail but are not to be construed as limitative.

EXAMPLE 1

| Acceleration of Epoxy Resin Curing with JEFFAMINE ® D-230 and Various Accelerator Blends | | | | | |
|---|---|---|---|---|---|
| Formulation 6253 | −45C | −16D | −25A | −25C | −25E |
| Epoxy resin (EEW ~ 185) | 100 | 100 | 100 | 100 | 100 |
| JEFFAMINE ® D-230 | 32 | 32 | 32 | 32 | 32 |
| Accelerator Blend TEA/Piperazine/DMP-30, pbw | | | | | |
| 80/20/0 | 10 | — | — | — | — |
| 60/20/20 | — | 10 | — | — | — |
| 50/20/30 | — | — | 10 | — | — |
| 40/20/40[1] | — | — | — | 10 | — |
| 0/0/100 | — | — | — | — | 10 |
| Exothermic Properties (Bulk Curing) | | | | | |
| Brookfield visc., cps, ~25° C. | 900 | 500 | 600 | 600 | 700 |
| Gel time, min (200 g mass) | 26.5 | 27.3 | 35.8 | 40.2 | 168.5 |
| Peak exothermic temp, °C. | 216.8 | 216.0 | 207.5 | 207.8 | 186.8 |
| Time to peak temp, min | 33.2 | 32.0 | 42.0 | 45.5 | 181.0 |
| Coating Properties 6253 | −40A | −40C | −40D | −40E | −40F |
| Drying time, 6 mil film | | | | | |
| Set-to-touch time hrs | 6.1 | 4.6 | 4.7 | 4.3 | 3.7 |
| Surface-dry time, hrs | 9.0 | 7.9 | 7.8 | 6.8 | 5.3 |
| Thru-dry time, hrs | 14.4 | 11.4 | 10.0 | 9.0 | 6.3 |
| Pencil hardness after: | | | | | |
| 24 hrs, ~25° C. | F | H | H | H | H |

Acceleration of Epoxy Resin Curing with
JEFFAMINE ® D-230 and Various Accelerator Blends

| | | | | | |
|---|---|---|---|---|---|
| 7 days | H | H | H | H | H |
| 24 hrs ~25° C., 1 hr, 80° C. 1 hr, 125° C. | H | H | H | H-2H | H |
| Gardner impact, in-lbs to fail after: | | | | | |
| 24 hrs ~25° C. | 48/24 | 20/<4 | 20/<4 | 20/<4 | 8/<4 |
| 7 days | 64/28 | 32/<4 | 32/<4 | 24/<4 | 8/<4 |
| 24 hrs ~25° C., 1 hr, 80° C. 1 hr, 125° C. | ...all... | | >160/>160 | ...156/ | >160 |

[1] Crystals formed on storage at 0° to 10° C. for 7 days.

Blends of TEA/piperazine/tris(dimethylaminomethyl)phenol (DMP-30) when added in small amounts to epoxy/JEFFAMINE®-230 formulations, resulted in rapid curing of epoxy in mass (200 g), much more so than did DMP-30 alone. Substitution of rather large amounts of DMP-30 for TEA had minimal effect on cure rate in mass. Such a substitution, at the same time, resulted in more rapid curing of thin films as shown in drying time results. Coatings containing any of the accelerator blends were hard and tended to be more brittle (lower Gardner impact values) with increased amounts of DMP-30 in the accelerator blend. This brittleness was minimized through proper choice of TEA/piperazine/DMP-30 mixture.

EXAMPLE 2

Coatings properties: Acceleration of Epoxy Resin Cure with
JEFFAMINE ® D-400 and Various Accelerator Blends Formulation:
Epoxy resin (EEW~185)  100 pbw
JEFFAMINE ® D-400  55 pbw
Accelerator Blend  10 pbw Accelerator Blend (TEA/Piperazine/DMP-30, pbw)

| Properties 6253 | 80/20/0 −45D | 70/20/10 −34B | 60/20/20 −34C | 50/20/30 −34D | 0/0/100 −34E |
|---|---|---|---|---|---|
| Brookfield visc., cps, ~25° C. | 600 | 500 | 500 | 500 | 500 |
| Gel time, min (200 g mass) | 59.0 | 53.2 | 57.5 | 64.2 | 315.0 |
| Peak exothermic temp, °C. | 132.5 | 148.5 | 148.8 | 150.5 | 115.0 |
| Drying time, 6253 6 mil film | −43A | −43B | −43C | −43D | −43E |
| Set-to-touch, hrs | 10.0 | 10.4 | 10.0 | 9.4 | 7.0 |
| Surface-dry, hrs | 13.3 | 13.9 | 12.8 | 12.7 | 8.7 |
| Thru-dry, hrs | 17.0 | 17.3 | 16.2 | 15.6 | 14.8 |
| Pencil hardness after: | | | | | |
| 24 hrs, ~25° C. | H[1] | H[1] | 2H[1] | H-2H[1] | F |
| 7 days, ~25° C. | F | H | H | H | H |
| Gardner impact, in-lbs to fail after: | | | | | |
| 24 hrs, ~25° C. | ...all... | | >160/>160... | | |
| (dir/rev.) 7 days, ~25° C. | ...all... | | >160/>160... | | |

[1] Indented without permanent mar with softer leads.

As in Example 1, cure times in mass with accelerators containing DMP-30 were much like the formulation in which the accelerator contained only TEA and piperazine. Cure times of these blends were much shorter than was that of the formula in which the accelerator consisted only of DMP-30. Drying times of thin films were accelerated with blends which contained increased amounts of DMP-30. Only small differences were seen in cured film properties.

EXAMPLE 3

Coatings Properties: Acceleration of Epoxy Resin Cure with
JEFFAMINE ® T-403 and Various Accelerator Blends Formulation:
Epoxy resin (EEW~185)  100 pbw
JEFFAMINE ® T-403  42 pbw
Accelerator Blend  10 pbw Accelerator Blend (TEA/Piperazine/DMP-30; wt ratio)

| Properties 6253 | 80/20/0 −35A | 70/20/10 −35B | 60/20/20 −35C | 50/20/30 −35D | 0/0/100 −35E |
|---|---|---|---|---|---|
| Brookfield visc., cps, ~25° C. | 1400 | 1400 | 1600 | 1600 | 1600 |
| Gel time, min (200 g mass) | 24.8 | 27.2 | 34.8 | 35.7 | 198.0 |
| Peak exothermic temp, °C. | 201.0 | 183.0 | 198.2 | 201.8 | 163.8 |
| Drying time, 6 mil film | | | | | |
| Set-to-touch, hrs | 5.6 | 5.1 | 4.3 | 4.6 | 4.9 |
| Surface-dry, hrs | 7.4 | 7.1 | 7.0 | 7.1 | 6.4 |
| Thru-dry, hrs | 9.6 | 9.2 | 10.0 | 9.2 | 8.0 |
| Pencil hardness after: | | | | | |
| 24 hrs, ~25° C. | H | H | H | H | H |
| 7 days | H | H | H | H | H |
| Gardner impact, in-lbs to fail after: | | | | | |

-continued

| Coatings Properties: Acceleration of Epoxy Resin Cure with JEFFAMINE ® T-403 and Various Accelerator Blends | | | | | |
|---|---|---|---|---|---|
| 24 hrs ~25° C. | 100/20 | 96/20 | 40/8 | 36/<4 | 8/<4 |
| (dir./rev.) 7 days | 32/8 | 28/16 | 28/12 | 32/8 | 16/<4 |

EXAMPLE 4

| Coatings Properties: Acceleration of Epoxy Resin Cure with VERSAMID ® 140[1] and Various Accelerator Blends | | | | | |
|---|---|---|---|---|---|
| Formulation: | | | | | |
| Epoxy resin (EEW~525)[2] | | | 100 pbw | | |
| VERSAMID ® 140 [1] | | | 17 pbw | | |
| Leveling agent[3] | | | 3 pbw | | |
| Accelerator Blend | | | 10 pbw | | |
| | Accelerator Blend (TEA/Piperazine/DMP-30, wt ratio) | | | | |
| | 80/20/0 | 70/20/10 | 60/20/20 | 50/20/30 | 0/0/100 |
| Properties 6253 | −52A | −52B | −52C | −52D | −52E |
| Drying time, 6 mil film | | | | | |
| Set-to-touch, hrs | 4.8 | 4.0 | 3.8 | 2.9 | 2.7 |
| Surface-dry, hrs | 5.9 | 5.1 | 5.0 | 4.7 | 3.6 |
| Thru-dry, hrs | 8.0 | 8.0 | 7.0 | 6.0 | 5.0 |
| Pencil hardness after: | | | | | |
| 24 hrs, ~25° C. | B[4] | 2B[4] | HB[4] | HB[4] | 2B[4] |
| 7 days, ~25° C. | F[4] | F[4] | F[4] | F[4] | HB |
| 24 hrs, ~25° C., 1 hr 80°, 1 hr 125° C. | F | F | F | F | H |
| Gardner impact, in-lbs to fail after: | | | | | |
| 24 hrs ~25° C. | ... all ... >160/>160 ... | | | | |
| (dir./rev.) 7 days | ... all ... >160/>160 ... | | | | |
| 24 hrs, ~25° C., 1 hr 80° C., 1 hr 125° C. | >160/>160 | 40/12 | 28/>4 | >160/>160 | 16/>4 |

[1] Amidopolyamine; amine value 370-400; Henkel Corp.
[2] 60% solid resin in 50/50 pbw xylene, n-Butanol mixture
[3] Beetle 216-8; American Cyanamid Co.
[4] Indented without permanent marring with softer leads.

EXAMPLE 5

| Physical Properties: Acceleration of Epoxy Resin Cure with JEFFAMINE ® D-230 and Various Accelerator Blends | | | | | | |
|---|---|---|---|---|---|---|
| Formulation: | | | | | | |
| Epoxy resin (EEW~185) | | | 100 pbw | | | |
| JEFFAMINE ® D-230 | | | 32 pbw | | | |
| Accelerator Blend | | | 10 pbw | | | |
| | Accelerator Blend (TEA/Piperazine/DMP-30, wt ratio) | | | | | |
| Formulation[2] 6253 | −33C | −36A | −21D | −36B | −36C | −36D |
| | (80/20/0) | (70/20/10) | (60/20/20) | (50/20/30) | (40/20/40) | (0/0/100) |
| Izod impact strength, ft-lbs/in | 0.10 | 0.12 | 0.16 | (1) | (1) | (1) |
| Tensile strength, psi | 7900 | 6600 | 4400 | — | — | — |
| Tensile modulus, psi | 473000 | 452000 | 462500 | — | — | — |
| Elongation at break, % | 1.9 | 1.5 | 1.2 | — | — | — |
| Flexural strength, psi | 11900 | 10700 | 11400 | — | — | — |
| Flexural modulus, psi | 473500 | 492500 | 488000 | — | — | — |
| HDT,°C., 264 psi/66 psi | 40/44 | 44/45 | 43/45 | — | — | — |
| Shore D hardness, 0-10 sec | 60-57 | 60-57 | 61-58 | — | — | — |
| Compressive strength | | | | | | |
| at yield, psi | 12400 | 13000 | 13100 | 13700 | 9100 | 3800 |
| at failure, psi | 30250 | 34500 | 33900 | 13700 | 9100 | 3800 |
| % Weight gain, | | | | | | |
| 24 hr water boil | 3.5 | 4.0 | 4.3 | — | — | — |
| 3 hr acetone boil | 32.4 | 33.5 | 31.5 | — | — | — |
| Adhesive Properties[2] | | | | | | |
| Tensile shear strength, psi | 1200 | 1100 | 1100 | 900 | 600 | 300 |
| T-peel strength, pli | 5.3 | 5.6 | 3.8 | 3.8 | 2.5 | (3) |

[1] Panel brittle - could not cut into test samples, compressive, adhesive properties only determined.
[2] Cure - 7 days, ~25° C.
[3] Could not test; test samples broke when placed into test apparatus.

Data indicate the embrittling nature of DMP-30 and the effect on properties when used in excess. Results show that accelerator mixtures containing larger amounts of DMP-30 resulted in brittle cures with JEFFAMINE ®-230 that were without strength. With lower amounts of DMP-30 in the accelerator blend, satisfactory cure resulted and properties were equivalent or better than cures with an accelerator blend containing no DMP-30. The embrittling nature of DMP-30 containing accelerators would be expected on combination with any of the more reactive amine curatives.

| Table of Test Methods | |
|---|---|
| Gel Time (minutes) | ASTM D-2471-71 |
| Pencil hardness (cure) | ASTM D-3363-74 |
| Gardner impact | ASTM D-2794-69 |
| Shore D-Hardness 0–10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft lbs/in) | ASTM D-256 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength at Yield; at Failure (psi) | ASTM D-695 |
| T-peel strength (pli) | ASTM D-1876 |
| Tensile shear strength (psi) | ASTM D-1002 |

TABLE OF COMPOUNDS

JEFFAMINE ® D-230, D-400 and D-2000 are represented by the structure:

$$H_2NCH(CH_3)CH_2-[OCH_2CH(CH_3)]_xNH_2$$

-continued

TABLE OF COMPOUNDS wherein:

| JEFFAMINE ® | x (approx.) |
|---|---|
| 2000 | 33.1 |
| 400 | 5.6 |
| 230 | 2.6 |

JEFFAMINE ® T-403 is represented by the sturcture:

$$CH_3CH_2-\underset{\underset{C_2[OCH_2CH(CH_3)]_zNH_2}{|}}{\overset{\overset{CH_2[OCH_2CH(CH_3)]_xNH_2}{|}}{C}}-CH_2[OCH_2CH(CH_3)]_yNH_2$$

DMP-30 is tris(dimethylaminomethyl)phenol.

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. A composition comprising an epoxy resin and an accelerator comprising: 50 to 60 parts by weight triethanolamine, 20 to 30 parts by weight tris(dimethylaminomethyl)phenol and the balance piperazine.

* * * * *